United States Patent [19]

Nakajima et al.

[11] Patent Number: 4,595,936
[45] Date of Patent: Jun. 17, 1986

[54] RECORDING APPARATUS WITH A RETRACTABLE RECORDING HEAD

[75] Inventors: Toshifumi Nakajima, Yokohama; Takehiko Kiyohara, Zama, both of Japan

[73] Assignee: Canon Kabushiki Kaisha, Tokyo, Japan

[21] Appl. No.: 464,574

[22] Filed: Feb. 7, 1983

[30] Foreign Application Priority Data

Feb. 12, 1982 [JP] Japan .................................. 57-19553

[51] Int. Cl.⁴ ........................................... G01D 15/16
[52] U.S. Cl. .................................. 346/139 R; 400/120
[58] Field of Search ..................... 346/139 R; 400/120, 400/124, 320

[56] References Cited

U.S. PATENT DOCUMENTS

| | | | |
|---|---|---|---|
| 2,798,725 | 7/1957 | Marshal | 346/139 R |
| 3,441,945 | 4/1969 | Leidy | 346/139 R |
| 3,945,022 | 3/1976 | Distler | 346/139 R |
| 4,030,588 | 6/1977 | Hanagata | 400/120 |
| 4,136,977 | 1/1979 | Krauss | 400/120 |
| 4,173,273 | 11/1979 | Hanakata | 400/320 |
| 4,396,922 | 8/1983 | Phillipps | 346/139 R |

FOREIGN PATENT DOCUMENTS 1231258  5/1971  United Kingdom .

Primary Examiner—E. A. Goldberg
Assistant Examiner—Mark Reinhart
Attorney, Agent, or Firm—Fitzpatrick, Cella, Harper & Scinto

[57] ABSTRACT

A reading and recording apparatus uses the moving force of the recording/reading head, instead of a separate drive source such as a solenoid, to effect up and down movement of the head, and also maintains the head in a retracted position during a reading operation, thereby reducing the power consumed by the apparatus. The construction of the inventive apparatus is simplified by effecting movement of the head between recording and retracted positions in response to the movement accompanying the scanning of the head and the scanning position of the head.

2 Claims, 15 Drawing Figures

RECORDING APPARATUS WITH A RETRACTABLE RECORDING HEAD

BACKGROUND OF THE INVENTION

1. Field of the Invention

This invention relates to a recording apparatus in which a recording head used in a facsimile apparatus or the like is moved up and down so as to be brought into contact with recording paper only during recording.

2. Description of the Prior Art

The receiver side of a facsimile apparatus has a recording apparatus, and a facsimile apparatus called the semimulti type is known in which a head provided with a plurality of recording elements arranged in the minor scanning direction and a reading element are mounted on a carriage and recording and reading are effected with the carriage moved in the major scanning direction.

This semimulti type facsimile apparatus, as compared with a full multi type facsimile apparatus, has been widely adopted because the reading element and the recording elements can be constructed inexpensively.

Figure 1:
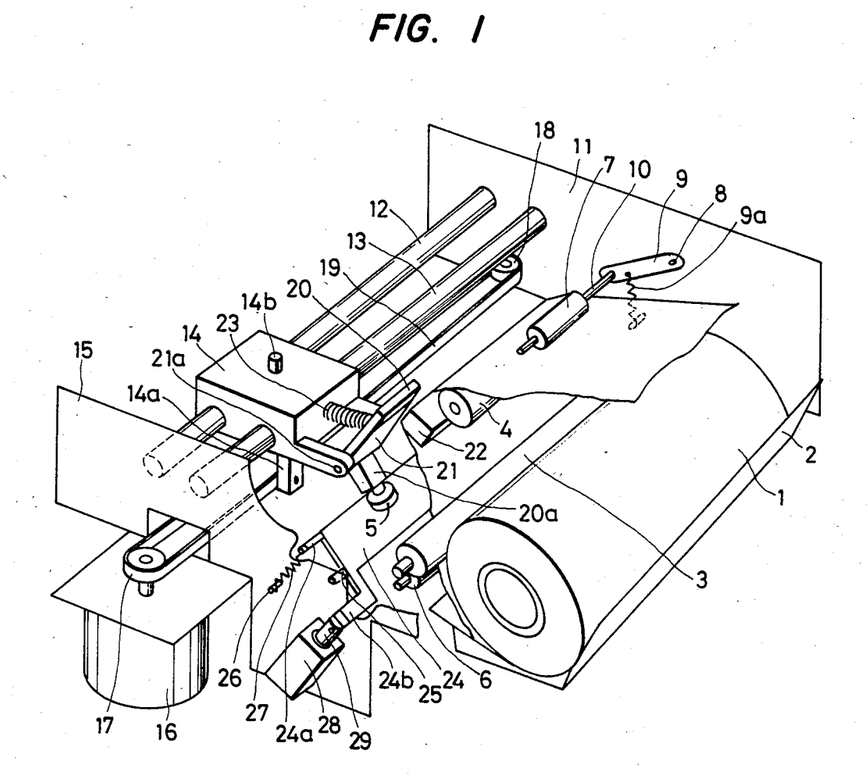
FIG. 1 is a perspective view showing the essential portions of a recording apparatus according to the prior art.

The recording portion of the conventional facsimile apparatus of this type has been constructed as shown in FIG. 1 of the accompanying drawings.

In FIG. 1, rolled recording paper 1 is held by a cradle 2 and directed while being in contact with rollers 3 and 4 for conveying the recording paper 1 in the minor scanning direction. The rollers 3 and 4 are rotated by a drive source, not shown. Pressure rollers 6 and 7 are in contact with the side surfaces of the rollers 3 and 4 and press the recording paper 1 between the rollers 3 and 4. The roller 7 is supported by a lever 9 rotatable about a pin 8 through the intermediary of a shaft 10, and is urged against the roller 4 by a spring 9a extended between the lever 9 and a side wall 11.

A carriage designated by reference numeral 14 is slidably fitted on guide shafts 12 and 13 and movable between side walls 11 and 15.

Designated by 16 is a major scanning motor, the rotation of which is transmitted to a belt 19 passed over a pulley 17 fixed to the output shaft of the motor and a pulley 18 rotatably supported on the frame side of the apparatus and is further transmitted to the carriage 14 fixed to the belt 19 through an arm 14a. A reading lens 14b and its accessary reading element, not shown, are provided on the upper surface of the carriage 14.

Further, a pivotable lever 21 is rotatably supported on the carriage 14 by means of a pin 21a, and a head 20 (recording element) is mounted on the outer side surface of the upper end portion of the pivotable arm 21 and a roller 5 is rotatably journalled to the end of the shaft portion 20a of the lower end of the pivotable arm. A spring 23 is resiliently disposed between the pivotable arm 21 and the carriage 14 and normally biases the pivotable arm 21 in the head-down direction. A platen 22 is mounted at a location corresponding to the head 20.

Designated by 24 is a head cocking member rotatably journalled between the side walls 11 and 15 through a pin 25. The head cocking member 24 is biased for counter-clockwise rotation, as viewed in FIG. 1, by a spring 27 extended between a pin 24a provided at one end of the head cocking member and a pin 26 provided on the side wall 15, and except during the head-up, it assumes a position in which it does not interfere with the roller 5.

The arm 24b of the head cocking member 24 which is projectedly provided on the opposite side to the pin 24a is connected to the actuator 29 of a solenoid 28 fixed to the side wall 15 and, when the solenoid 28 is energized, the actuator 29 is attracted and the head cocking member 24 is clockwisely pivoted against the force of the spring 27, so that the pivotable arm 21 is pivoted counter-clockwise through the roller 5 to provide a head-up position.

Under the structure as described above, the carriage 14 lies at a home position near the side wall 11 when recording is started. In this position, the supply of power to the solenoid 28 is cut off and therefore, the head cocking member 24 is at its extreme of counter-clockwise position and the pivotable arm 21 is pivoted clockwise, and the head 20 is in a head-down position wherein it is urged against a platen 22 with the recording paper 1 interposed therebetween.

When, in this position, the major scanning motor 16 is rotated clockwise, the carriage 14 is moved toward the side wall 15 through the agency of the belt 19. Therefore, the head 20 effects recording on the recording paper 1 in accordance with an image signal during the movement of the carriage.

When a predetermined stroke of the recording operation is terminated, the solenoid 28 is energized to pivot the head cocking member 24 clockwise, so that the pivotable arm 21 is counter-clockwise pivoted through the agency of the roller 5 and the head 20 assumes a head-up position in which it is separated from the recording paper 1. At the same time, the major scanning motor 16 is rotated counterclockwise, so that the carriage 14 returns toward the side wall 11 and stops at its initial start position. During the return movement of the carriage 14, the solenoid 28 remains energized and the head 20 keeps its head-up position.

What has been described above is the operation in the recording mode. In the case of the reading mode, it is necessary that the solenoid 28 continue to be supplied with power so as to normally provide the head-up position.

However, adoption of the above-described structure leads to the following disadvantages.

(1) A powerful solenoid is necessary to effect the head-up position.

(2) A drive circuit for driving the solenoid and a power source are necessary and particularly, power consumption of the solenoid is great as compared with the driving power for other electric circuits and accordingly, the use of the solenoid results in increased volume and capacity of the power source portion, which in turn results in higher cost and bulkiness of the apparatus.

(3) A complex mechanism for separating the head from the recording paper in response to the operation of the actuator of the solenoid is required and this leads to higher cost. That is, in the conventional recording apparatus of the described type, the head-down position is effected only during recording to bring the head into contact with the recording paper, and the head-up position is effected during the carriage return and during the reading operation. A solenoid or the like has been employed as the drive source for effecting such head-down position or head-up and therefore, power must be continued during the time the head is kept in one of the head-up and the head-down position, and this means waste of power. Of course, when the head is changed from the head-up position to the head-down position or from the head-down position to the head-up position, power is also necessary and this means the necessity of much power consumption.

Also, it is necessary to provide the solenoid, etc. on the apparatus body side and this leads to corresponding complication of the apparatus.

SUMMARY OF THE INVENTION

It is a first object of the present invention to avoid consumption of great power during up and down movement of the recording head.

It is a second object of the present invention to avoid using a drive source such as a solenoid to effect up and down movement of the recording head, thereby simplifying the structure of the apparatus and reducing the manufacturing cost thereof.

It is a third object of the present invention to move the recording head up or down by the information of the scanning position.

The invention will become fully apparent from the following detailed description thereof taken in conjunction with the accompanying drawings.

DESCRIPTION OF THE PREFERRED EMBODIMENT

Figure 2:
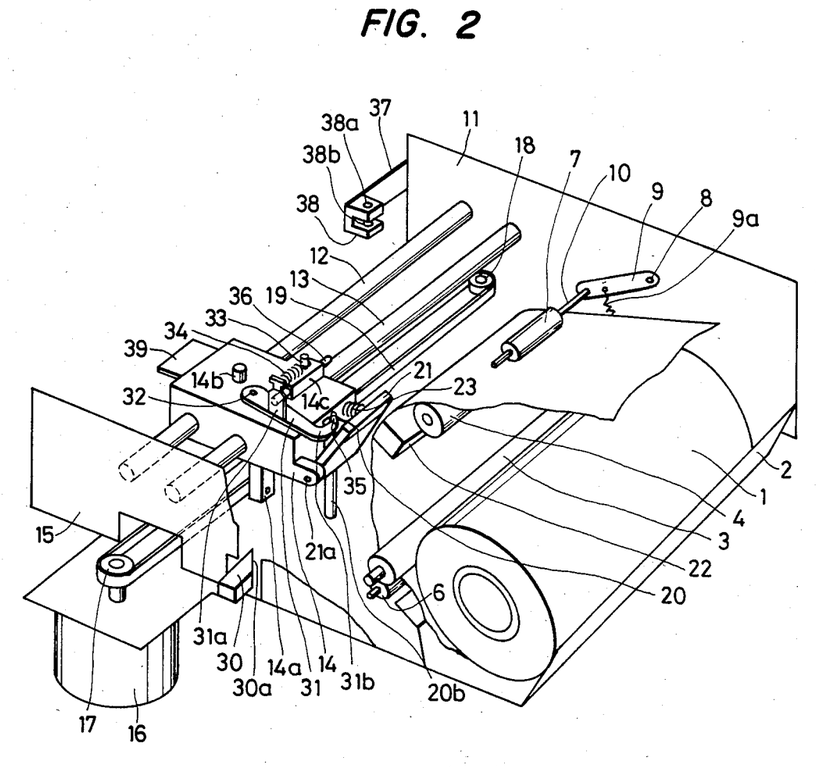
FIG. 2 is a perspective view illustrating an embodiment of the present invention.

In FIG. 2 which illustrates an embodiment of the present invention, parts similar or corresponding to those of FIG. 1 are given similar reference numerals and the description thereof will be omitted.

In the present embodiment, a head cocking pin 20b integral with a pivotable arm 21 is projectedly provided on the lower end of the pivotable arm 21 and this pin 20b is in a position wherein it is engageable with the cam surface 30a of a cam 30 provided on a side wall 15 which is adjacent to the return position side. A reading lens 14b and its accessory reading element, not shown, are provided on the upper surface of a carriage 14.

A hook lever 31 is pivotably supported on the upper surface of the carriage 14 by means of a pin 32, and a bent portion 31a is projectedly provided on the intermediate portion of the hook lever 31, and further, a hook portion 31b formed on the end of the hook lever is in a position wherein it is engageable with a pin 35 projectedly provided on the upper end of the head cocking pin 20b.

A block 14c is fixed to the upper surface of the carriage 14, and a pin 36 for providing the head-down position is slidably fitted to the block 14c. One end of the pin 36 is in contact with the bent portion 31a and the other end of the pin 36 projects from the block 14c. A spring 34 is extended between a pin 33 fixed to the block 14c and the bent portion 31a and biases the hook lever 31 for counter-clockwise rotation as viewed in FIG. 2.

Further, a shield plate 39 is projectedly provided on the rear end of the carriage 14.

On the other hand, on a side wall 11 which is adjacent to the home position of the carriage 14, an arm 37 extends inwardly in parallelism to guide shafts 12 and 13, and a position detecting sensor 38 comprising a light-emitting element 38a and a light-receiving element 38b is attached to the end of the arm 37. The aforementioned shield plate 39 is adapted to intervene between the light-emitting element 38a and the light-receiving element 38b.

The basic operation of the mechanism portion having the structure as described above is similar to that of the conventional structure shown in FIG. 1. That is, movement of the recording paper 1 in the minor scanning direction and movement of the carriage 14 in the major scanning direction are entirely the same as in FIG. 1.

The head-up (or retracted) and head-down operations will now be described by reference to FIGS. 3(A)-3(D).

Figure 3A:
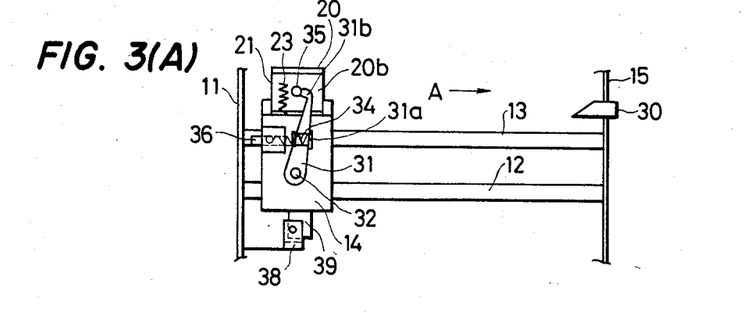
FIGS. 3(A)-3(D) are plan views showing the carriage in the home position and in the return position.

FIG. 3(A) shows the carriage in its start position. In this position, the engagement between the hook portion 31b of the hook lever 31 and the pin 35 is released and therefore, the pivotable arm 21 is in the head-down state due to the resilient force of the spring 23 and the head 20, i.e., the recording element, is in contact with the recording paper 1. In this position, the carriage 14 moves while effecting the recording in the direction of arrow A.

Figure 3B:
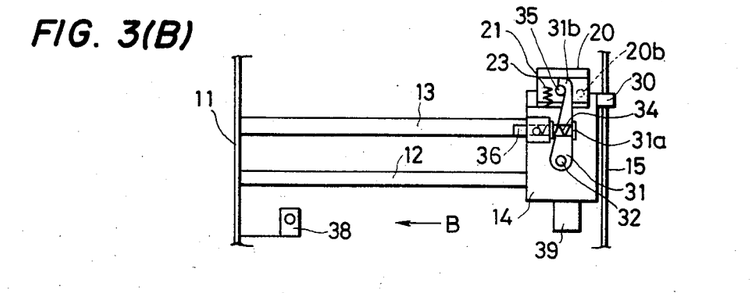

In FIG. 3(B), the carriage 14 has come to its return position and the pin 20b integral with the pivotable arm 21 has ridden onto the cam surface 30a of the cam 30 and is pivoted counter-clockwise about a pin 21a, as viewed in FIG. 2, and the pin 35 is also moved toward the carriage 14 and thus into engagement with the hook portion 31b of the hook lever 31, whereby locking is effected and the head-up position is provided. In this position, the carriage 14 returns in the direction of arrow B and approaches its home position.

Figure 3C:
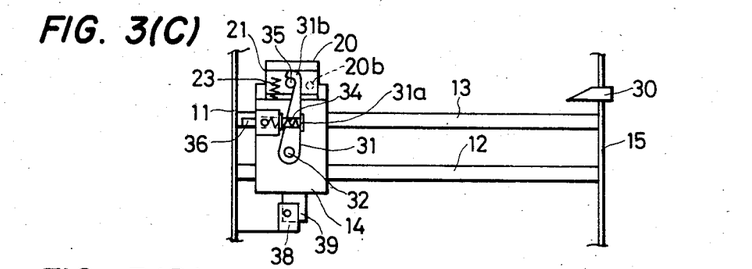

This position is shown in FIG. 3(C). In the position shown in FIG. 3(C), the shield plate 39 comes to the sensor 38 to cut off the light path between the light-emitting element and the light-receiving element and thus, the home position edge HE is detected and the movement of the carriage 14 is stopped. In this state, where it is desired to effect the next scanning in the head-up position, the carriage is moved in the direction of arrow A as in the case of FIG. 3(A).

Figure 3D:
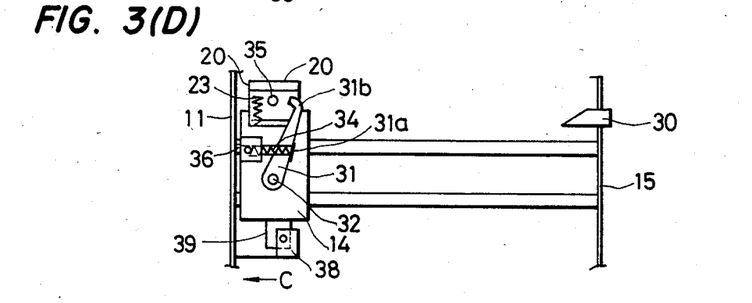

On the other hand, where the next scanning is effected in the head-down position, the carriage 14 is further moved toward the side wall 11 on the home position side, as shown in FIG. 3(D). Thereupon, the pin 36 for head-down comes into contact with the side wall 11 and projects toward the hook lever 31 side against the force of the spring 34 to push the bent portion 31a of the hook lever 31 and therefore, as shown in FIG. 3(D), the hook lever 31 is pivoted clockwise, whereby the engagement between the hook portion 31b and the pin 35 is released and the pivotable arm 21 is brought into the head-down position by the resilient force of the spring 23. From this state, the carriage 14 immediately returns to its start position shown in FIG. 3(A).

In this manner, where the recording operation is to be continuously repeated even in the head-down position, the operations of FIGS. 3(A)-3(D) are repeated and, where the non-recording operation or the reading operation which is the head-up position is to be repeated, the operations of FIGS. 3(A)-3(C) are repeated.

Figure 4A:
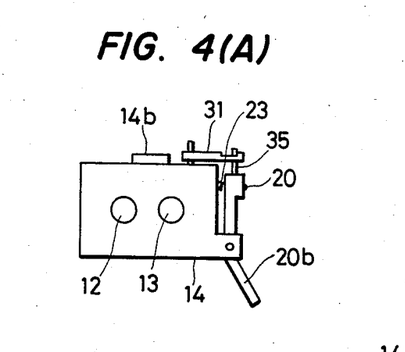
FIGS. 4(A)-4(C) are side views showing the head-up position, the head-down position and the movement from the head-down position to the head-up position, respectively, of the carriage.
Figure 4B:
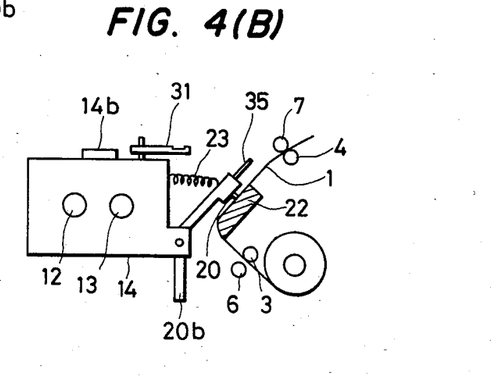
Figure 4C:
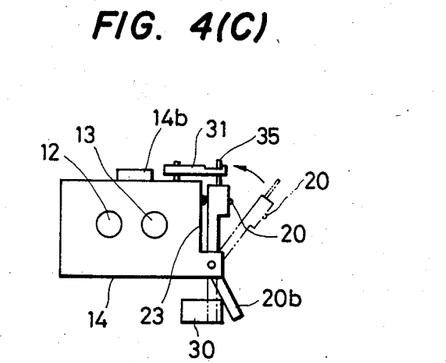

Now, FIGS. 4(A)-4(C) show side views of the carriage 14 in its respective positions. FIG. 4(A) shows a condition in which the carriage 14 lies intermediately of its home position and its return position and is in the head-up position.

FIG. 4(B) shows a condition in which the carriage 14 is in its home position and also in the head-down position with the hook lever 31 disengaged as shown in FIG. 3(A). In this condition, the head 20 is in contact with the recording paper 1 directed on a platen 22 and is ready to effect recording. The recording paper 1 is fed by feed rollers 3, 4, 6 and 7.

FIG. 4(C) shows a case where the carriage has approached its return position. In this case, the head cocking pin 20b provided on the lower end of the head 20 is in contact with the cam surface of the cam 30. This Figure illustrates the movement of the head from the head-down position back to the head-up position.

FIG. 5 illustrates the basic operation of the carriage of the apparatus of the present invention, and shows the position and operation of the carriage when a power source has been switched on.

In FIG. 5, the circular mark indicates the position of the carriage 14 when the power source has been switched on.

Figure 5A:
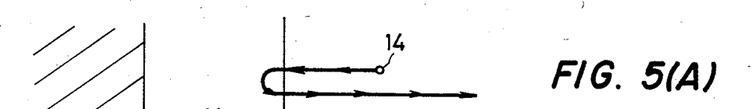
FIGS. 5(A)-5(D) are diagrams showing the operation of the carriage.
Figure 5B:
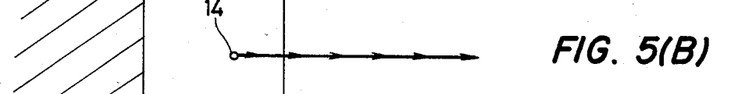
Figure 5C:
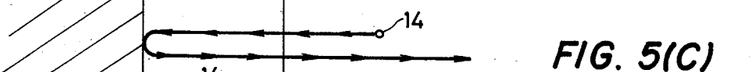
Figure 5D:
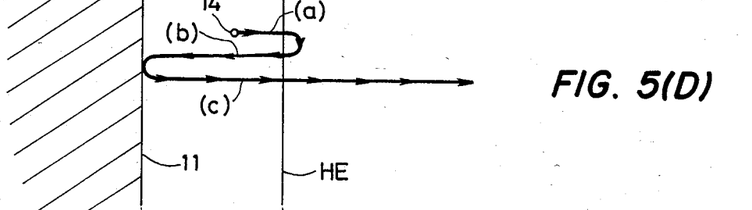

FIGS. 5(A) and 5(B) show a case where the facsimile apparatus is in the original reading mode, namely, the transmitting mode, and FIGS. 5(C) and 5(D) show a case where the facsimile apparatus is in the recording mode, namely, the receiving mode. The line designated by HE indicates the home position edge, and reference numeral 11 designates the side wall on the home position area side.

FIG. 5(A) shows a case where the apparatus is in the transmitting mode and the power source has been switched on when the carriage 14 is positioned on the right of the home position edge HE. In this case, the carriage 14 once goes past the home position edge HE and slightly comes into the home position area HA between the home position edge HE and the side wall 11 and further moves in the major scanning direction beyond the home position edge HE and thereafter effects the reading operation with the home position edge HE as the reference.

In such case, the amount of movement of the carriage into the home position area is small and the apparatus is in the transmitting mode and therefore, the head is in the head-up position, and further, the pin 36 for head-down movement is not in contact with the side wall 11 and thus, head-down does not take place.

FIG. 5(B) shows a case where the apparatus is in the transmitting mode and the carriage 14 is positioned in the home position area when the power source has been switched on and the pin 36 is not in contact with the side wall 11. In such case, the major scanning is initiated and the reading operation is effected with the home position edge HE as the reference.

The case of FIG. 5(C) is a case where the apparatus is in the receiving mode and the power source has been switched on with the carriage 14 positioned on the right of the home position edge HE. In such case, the carriage 14 goes past the home position edge HE and detects the HE and moves toward the side wall 11 to bring the pin 36 into contact with the side wall 11 and bring the hook lever 31 out of engagement with the pin 35, thereby effecting the head-down operation, whereafter the recording operation in the major scanning direction is effected with the home position edge HE as the reference.

The case of FIG. 5(D) is a case where the apparatus is in the receiving mode and moreover the carriage 14 is within the home position area. In such case, the carriage once goes slightly to the right of the home position edge HE in its movement stroke (a), whereafter it turns back and again goes into the home position area and is detected by the sensor 38, whereafter it effects an operation similar to that of FIG. 5(C) in its movement strokes (b) and (c) and effects head-down movement, thus entering the next recording operation.

Table 1 below is a table in which the above-described modes are tabulated for better understanding.

TABLE 1

| Case | Mode | Position of carriage when power source is ON |
|------|------|-----------------------------------------------|
| (A) | Reading (transmission) | Right of the home position edge HE |
| (B) | Reading (transmission) | Left of the home position edge HE |
| (C) | Recording (reception) | Right of the home position edge HE |
| (D) | Recording (reception) | Left of the home position edge HE |

Figure 6:
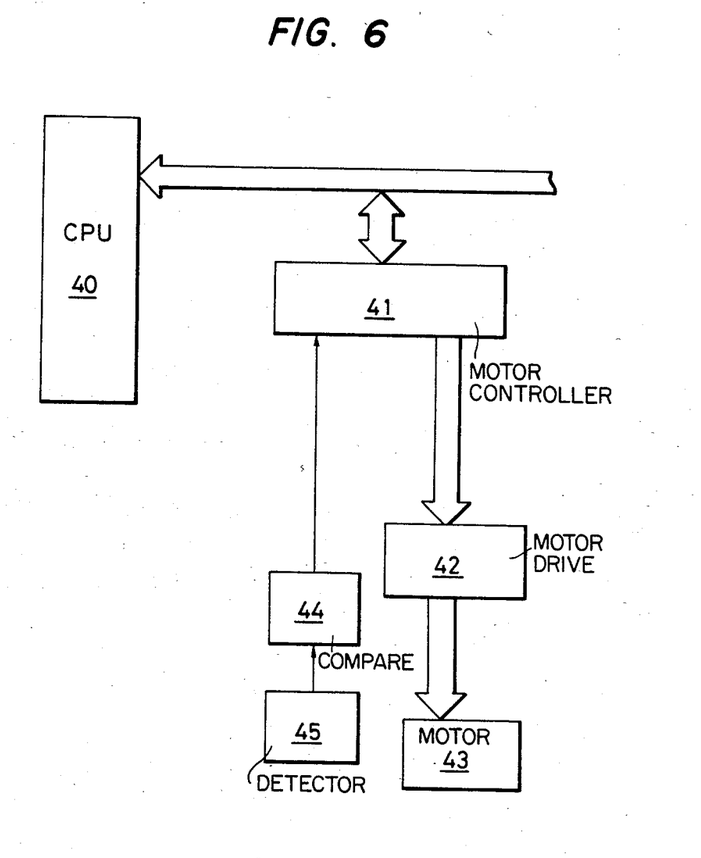
FIG. 6 is a block diagram of the control circuit.

Referring now to FIG. 6 which is a block diagram of the control circuit, reference numeral 40 designates a main controller (CPU). When a signal for starting the operation is put out from this CPU to a motor controller 41, the motor controller 41 judges whether that signal is a reading operation starting signal or a recording operation starting signal. The motor controller 41 obtains through a comparator 44 the signal from a home position detecting sensor 45 to know the then position of the carriage and, by these two signals, the controller 41 judges into which of the four cases of FIGS. 5(A)-5(D) the movement of a motor 43 should be rendered, and puts out a motor driving signal for causing a motor driving circuit 42 to effect a predetermined operation.

A program for judging which of the operations of FIGS. 5(A)-5(D) should be effected is stored in the motor controller 41.

Figure 7:
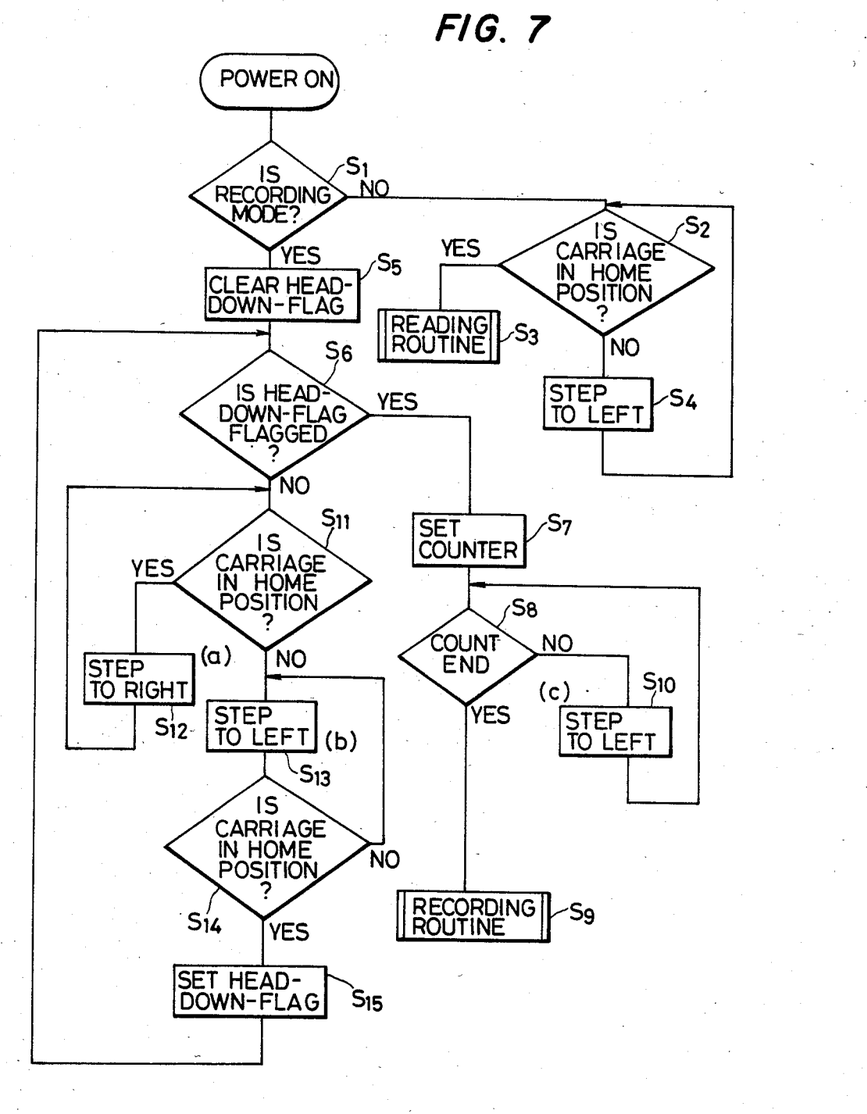
FIG. 7 is a flow chart illustrating the operation.

The control operation will now be described by reference to the flow chart of FIG. 7.

First, at step $S_1$, whether the apparatus is in the recording mode is judged. If the apparatus is not in the recording mode, that is, if the apparatus is in the reading mode (the transmitting mode), whether the carriage is within the home position area is judged at step $S_2$ and, if the carriage is within the home position area, the reading routine is entered at step $S_3$.

If the carriage is not within the home position area, it repeats the operation of stepping to left and returning to step $S_2$ and repeats the stepping to left until it enters the home position area.

On the other hand, when, at step $S_1$, it has been judged that the apparatus is in the recording mode, the head-down-flag of the buffer memory in the controller 21 is cleared at step $S_5$ and whether the head-down-flag has been flagged is judged at step $S_6$ and, if the head-down-flag has been flagged, the counter is set at step $S_7$ and whether the count has been terminated is judged at step $S_8$ and, if the count has been terminated, the recording routine is entered at step $S_9$.

When, at step $S_8$, it has been judged that the count has not been terminated, stepping to left is effected at step $S_{10}$ (the operation indicated by (b) of FIG. 5(D)), and the steps to a predetermined step position in which the carriage approaches the side wall 11 and head-down is effected are counted and the recording routine is entered.

On the other hand, when, at step $S_6$, it has been judged that the head-down-flag is not flagged, the program shifts to step $S_{11}$ and whether the carriage is within the home position area is judged and, if the carriage is within the home position area, stepping to right takes place at step $S_{12}$ (the operation indicated by (a) of FIG. 5(D)), and stepping movement is effected to a position whereat the carriage goes to the right of the home position edge.

When, at step $S_{11}$, it has been judged that the carriage is not within the home position area, the operation of going to the left of the home position edge is effected at step $S_{13}$ (the operation indicated by (b) of FIG. 5(D)), and whether the carriage is within the home position area is judged at step $S_{14}$ and, if it has been judged that the carriage is within the home position area, the head-down-flag is set at step $S_{15}$ and the program returns to step $S_6$. When, at step $S_{14}$, it is judged that the carriage is not within the home position area, the program returns to step $S_{13}$ and stepping to left is repeated until the carriage is within the home position area.

In the above-described manner, the steps of the carriage shown in FIGS. 5(A)–5(D) are controlled and the up and down movement of the head is effected without using a drive source such as a solenoid and without involving power consumption.

As is apparent from the foregoing description, according to the present invention, the operation of the carriage striking against the side wall on the home position side through a pin and the operation of the carriage striking against the cam on the return position side are utilized and a cam and a spring are utilized to effect up and down movement of the head, and this leads to an excellent effect that up and down movement of the head can be accomplished by only the operation of the carriage without using a drive source such as a solenoid which involves power consumption.

What we claim is:

1. Recording and reading apparatus comprising:
   reciprocating means for reciprocating between first and second stop positions;
   a recording head mounted on said reciprocating means for recording on a recording medium;
   supporting means for supporting the recording medium;
   a read-out head mounted on said reciprocating means for reading image information on an original;
   applying means for urging said recording head to said supporting means by utilizing the moving force of said reciprocating means;
   retracting means for retracting said recording head from said supporting means by utilizing the moving force of said reciprocating means; and
   control means for operating said retracting means before reading image information with said read-out head and maintaining said recording head away from said support means while reading is performed and for operating said applying means before recording with said recording head and permitting said applying means to urge said recording head to said supporting means while recording is performed.

2. Recording and reading apparatus according to claim 1, wherein said applying means is permitted to urge said recording head to said supporting means by utilizing the moving force of said reciprocating means when said reciprocating means reaches the vicinity of said first stop position.

* * * * *